United States Patent [19]

Kossoff et al.

[11] Patent Number: 5,300,042

[45] Date of Patent: Apr. 5, 1994

[54] MEDICATION DISPENSING APPARATUS

[75] Inventors: Sheila Kossoff; Carole Sukel, both of Wayne; James Howard, Dover; Christopher Gieda, Stanhope, all of N.J.

[73] Assignee: Kossoff-Sukel, Inc., Wayne, N.J.

[21] Appl. No.: 844,718

[22] Filed: Mar. 2, 1992

[51] Int. Cl.⁵ .................... A61M 5/00; A61M 5/315; A61M 37/00; B67D 5/22
[52] U.S. Cl. .................... 604/210; 604/224; 604/155; 222/38
[58] Field of Search ............... 604/131, 151, 152, 155, 604/154, 186, 187, 207, 208, 210, 224, 246, 298; 222/36, 38

[56] References Cited

U.S. PATENT DOCUMENTS

| | | | |
|---|---|---|---|
| 1,896,056 | 1/1933 | Pepper | 222/38 |
| 3,395,704 | 8/1968 | Frey et al. | 604/154 X |
| 3,820,576 | 6/1974 | Torrent | |
| 4,313,439 | 2/1982 | Babb et al. | 604/246 X |
| 4,367,955 | 1/1983 | Ballew | |
| 4,417,889 | 11/1983 | Choi | 604/246 |
| 4,419,016 | 12/1983 | Zoltan | |
| 4,448,541 | 5/1984 | Wirtschafter | |
| 4,562,933 | 1/1986 | Dennis | |
| 4,585,439 | 4/1986 | Michel | 604/155 |
| 4,634,431 | 1/1987 | Whitney et al. | 604/155 |
| 4,740,205 | 4/1988 | Seltzer et al. | 604/192 |
| 4,852,620 | 8/1989 | Jakubowicz et al. | |
| 4,921,487 | 5/1990 | Buffet et al. | 604/135 |
| 4,926,572 | 5/1990 | Holmes | |
| 4,939,705 | 7/1990 | Hamilton et al. | |
| 4,950,246 | 8/1990 | Muller | 604/154 |
| 5,000,739 | 3/1991 | Kulisz et al. | 604/132 |
| 5,020,037 | 5/1991 | Raven | |
| 5,174,473 | 12/1992 | Marelli | 222/38 |

*Primary Examiner*—John D. Yasko
*Assistant Examiner*—Adam J. Cermak
*Attorney, Agent, or Firm*—Klauber & Jackson

[57] ABSTRACT

A medication dispensing apparatus comprising a liquid container having an open end and a cap assembly engagably removable from the open end of the container. The cap assembly comprises an external cap having a lower end, an inner fixing element adapted to be fitted into the open end of the liquid container and connected to the lower end of the external cap. The cap assembly further comprises a dropper connected through the inner fixing element and having a fluid passageway and activation element for aspirating liquid from the container into the dropper. The activation element comprises a piston mounted in sliding relationship within the fluid passageway of the dropper and having a first position at the lower end of the fluid passageway and a second position at the upper end of the fluid passageway, and an actuating elemnt disposed within the external cap and connected to the piston for advancing or retracting the piston within the fluid passageway thereby aspirating liquid from the container when the piston is retracted from its first position to its second position.

9 Claims, 5 Drawing Sheets

FIG. 4A
FIG. 4B
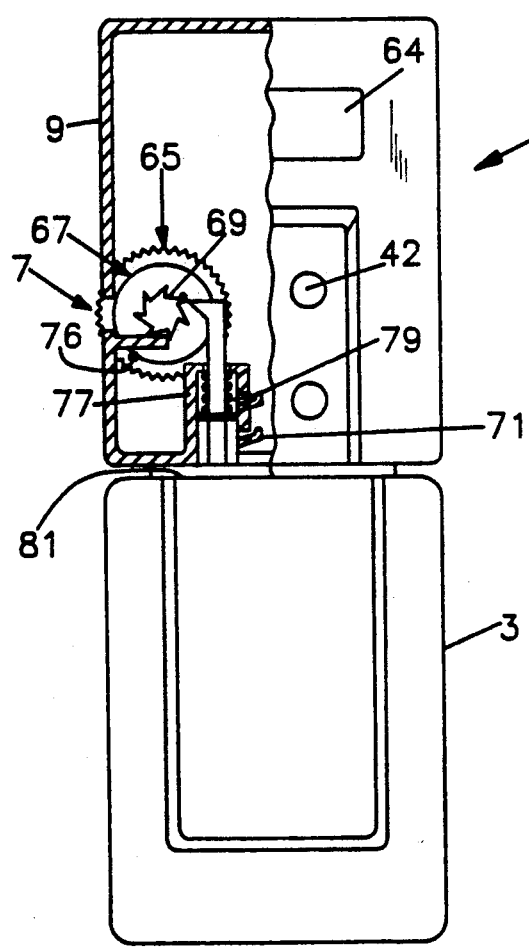
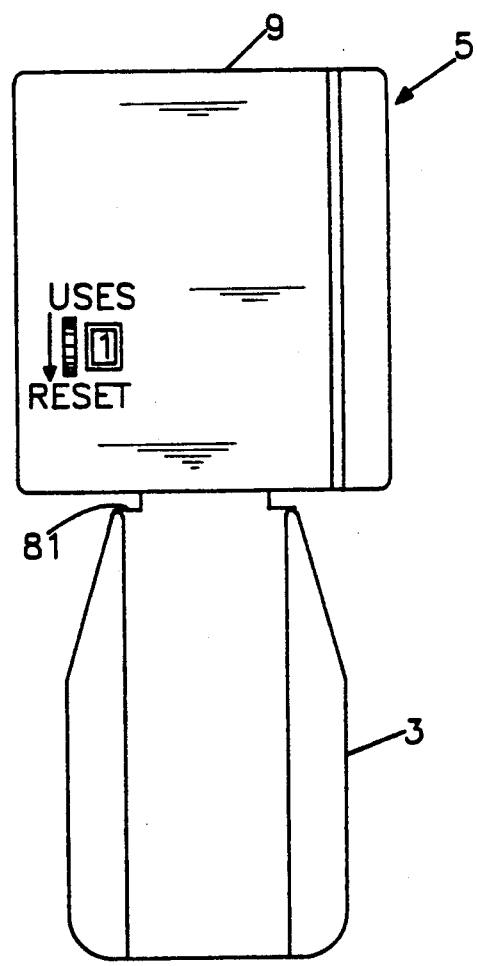

MEDICATION DISPENSING APPARATUS

FIELD OF THE INVENTION

This invention relates to devices for aspirating and dispensing liquid medication.

BACKGROUND OF THE INVENTION

Many prescribed drugs are designed to be taken at regular intervals during the day to achieve their proper effect. In fact, in certain diseases, such as heart disease and in the control of diabetes and blood pressure, missed dosages can prove quite serious. This is particularly common with the elderly and infirm since such patients have some difficulty recalling the time at which a previous dose of medicine was taken or even whether it was taken at all. Furthermore, such patients often must be reminded when the correct time comes to take the medication.

SUMMARY OF THE INVENTION

The present invention provides an accurate patient liquid medication dispenser combined with a medication use compliance aid which enables the user to readily ascertain the time remaining for the next dose of medication. The unit also automatically counts the number of dosages already taken during the day, permits the user to easily and accurately set the dosage and contains settable alarms to visually and/or audibly alert the user as to when the next dose is to be taken.

More specifically, the medication dispensing apparatus according to the invention comprises a liquid container having an open end and a cap assembly engagably removable from the open end of the container. The cap assembly comprises an external cap having a lower end and an inner fixing means adapted to be fitted into the open end of the liquid container and connected to the lower end of the external cap. The cap assembly further comprises a dropper means connected through the inner fixing means and having a fluid passageway and activation means for aspirating the liquid from the container into the dropper means. The activation means comprises a piston mounted in sliding relationship within the fluid passageway of the dropper means and having a first position at the lower end of the fluid passageway and a second position at the upper end of the fluid passageway, and an actuating means disposed within the external cap and connected to the piston means for advancing or retracting the piston within the fluid passageway thereby aspirating liquid from the container when the piston is retracted from its first position to its second position.

BRIEF DESCRIPTION OF THE DRAWINGS

FIG. 4A is an elevational view, partly in section, of the automatic counter portion of the apparatus shown in FIGS. 1-3;

FIG. 4B is a simplified side elevational view of the apparatus shown in FIG. 4A;

DETAILED DESCRIPTION OF THE INVENTION

Figure 1A:
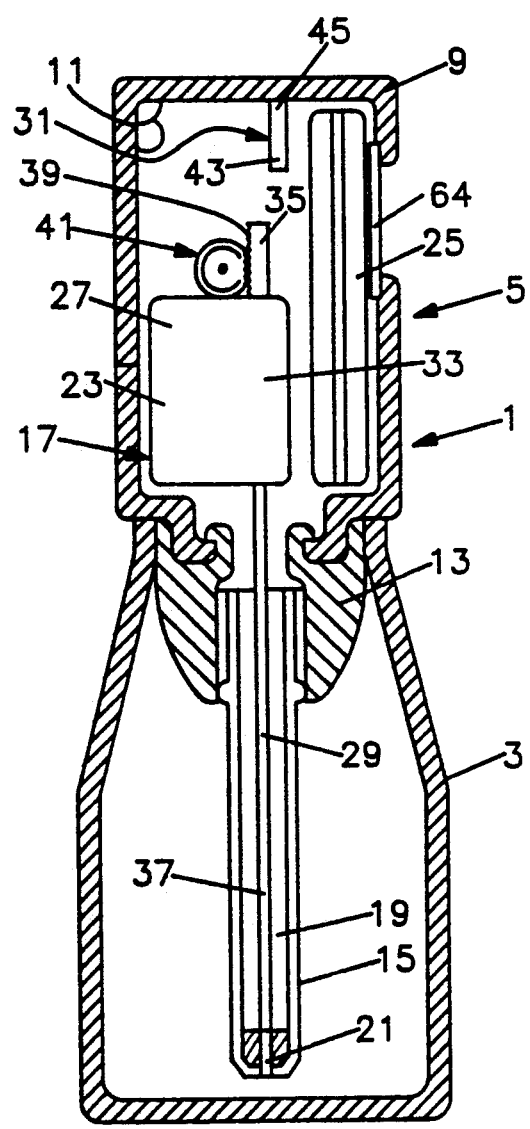
FIG. 1A is an elevational view, partly in section, of an apparatus constructed in accordance with the invention.

The preferred embodiment of the medication dispensing apparatus 1 is shown in FIGS. IA and IB comprises a liquid container 3 for liquid medicine, a cap assembly 5 which engages the neck of the container 3 and is fitted thereon through a bayonet-joint connection, and a automatic counter means 7 (shown in FIG. 4). The cap assembly 5 comprises a hollow external cap 9 having side walls 11, a stopper 13 connected to the lower end of the cap 9 which fits into the open end of the container 3, a dropper 15 extending through the stopper 13 into the lower end of the container 3, and an activator means 17 for aspirating liquid medication from the container 3 into the dropper 15. The stopper or inner fixing means 13 is adapted to be fitted into the open end of the liquid container 3 and engages it so as to be removable therefrom and is fixedly attached to the lower end of said cap 9. The dropper 15 at its open end extends through the stopper 13 and has a longitudinally extending fluid passageway 19. The activation means 17 is powered by a battery (not shown) and comprises a piston or piston means 21 slidably mounted in the passageway 19 of the dropper 15, an actuating means 23 connected to the piston 21 for advancing or retracting the piston 21 and aspirating the liquid from the container 3 when the piston 21 is retracted from the lower end of the passageway 19, and a conventional timer means 25 such as a universal timer module for controlling the actuating means 23 and providing the time. The actuating means 23 comprises an activating means 27, a rod member 29 and dosage limiting means 31. The activating means 27 in this embodiment comprises an electrically actuated means 33, a conventional linear solenoid. The rod member 29 has an upper and lower portion, 35 and 37 respectively, the lower portion 37 longitudinally extending within the fluid passageway 19 and its lower end affixed to an upper portion of the piston 21. The piston 21 is shown in its first position at the lower end of said passageway 19 and the lower portion of the piston 21 is shown blocking the entry of fluid into the passageway 19. The upper portion 35 of rod 29 comprises track means or track 39 which engages and is driven by the linear solenoid 33. The track 39 is shown in its first position and a damper 41 which engages the teeth of the track 39 is provided to prevent rapid movement of the track 39. The timer means 25 includes function keys or control means 42 which are used to both set the particular amount of liquid medication that is desired, which is the particular amount of liquid medicine which is to be aspirated into the dropper 15, and to initiate the aspiration. The timer 25 further includes an alarm, visible and/or audible, and a display 64. The dosage limiting means 31 comprises a limit means 43 which is disposed within the cap assembly 5 and prevents the upper end of the upper portion 35 of the rod 29 from traveling past a predetermined point, which point sets a predetermined amount of liquid medication which will be aspirated into the dropper 15. The limit means 43 comprises a removable elongated pin 45 having an upper threaded end screwed into and fixedly extending from an upper side wall 11 of the external cap 9. It lower end is disposed within the cap 9 to engage and prevent the upper end of the upper portion 35 of the rod 29 from traveling past the predetermined point.

Figure 1B:
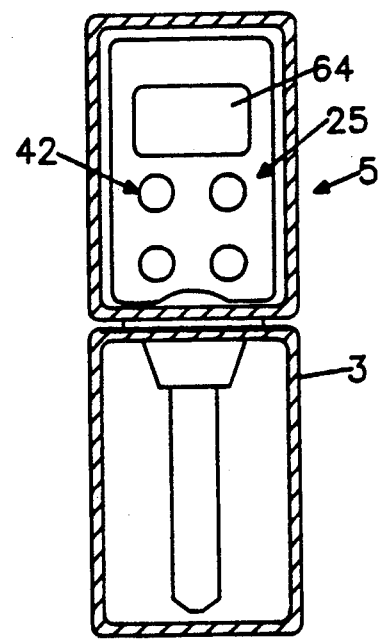
FIG. 1B is a simplified front elevational view, the container being in section, of the apparatus shown in FIG. 1A.
Figures 2A, 2B:
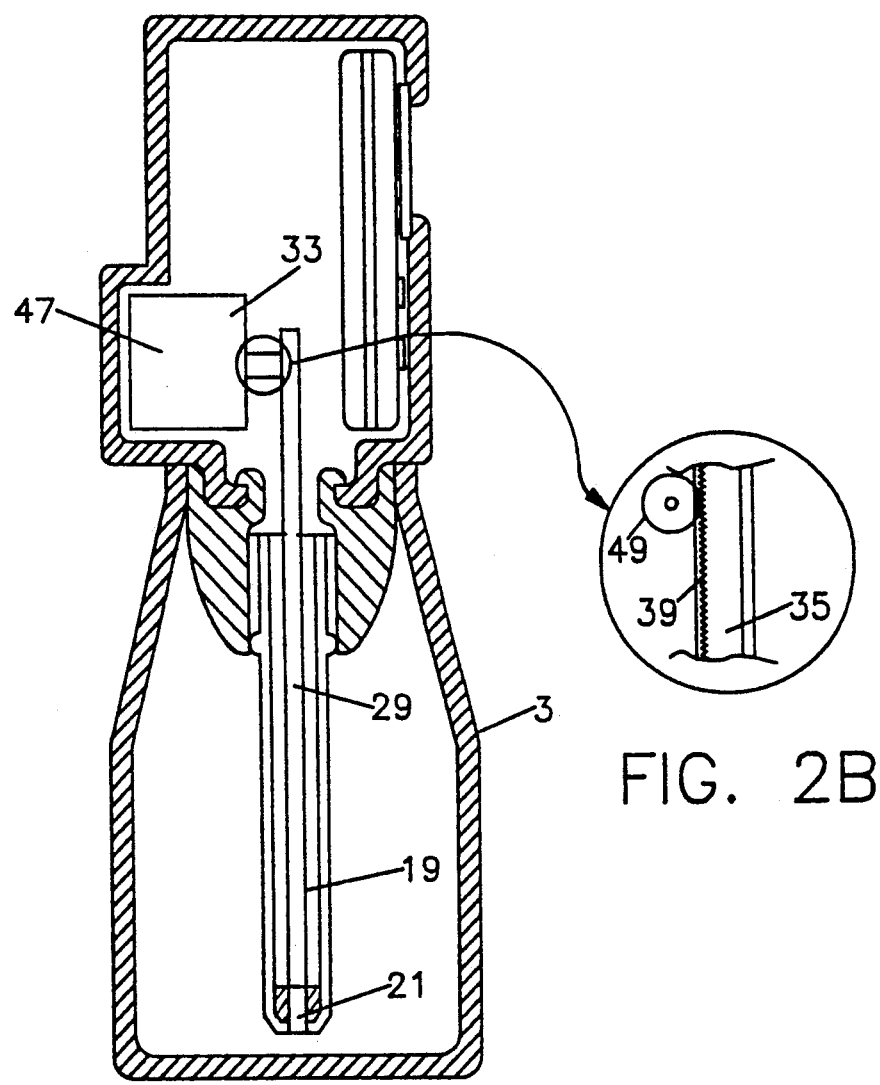
FIG. 2A is an elevational view, partly in section, of another embodiment of the invention.
FIG. 2B is an enlarged fragmentary view of the track mechanism of the apparatus shown in FIG. 2A.

The design of the medication dispensing apparatus shown in the embodiment of FIG. 2 is identical to the design of the embodiment shown in FIG. 1 except for the type of solenoid used in the electrically actuated means 33 and its coupling to the rod member 29. These electrically actuated means 33 comprise a conventional rotary solenoid 47 whose output is connected to a cog or drive gear 49, the teeth of which engage and drive the teeth on the upper portion 35 of the rod 29.

Figures 3A, 3B:
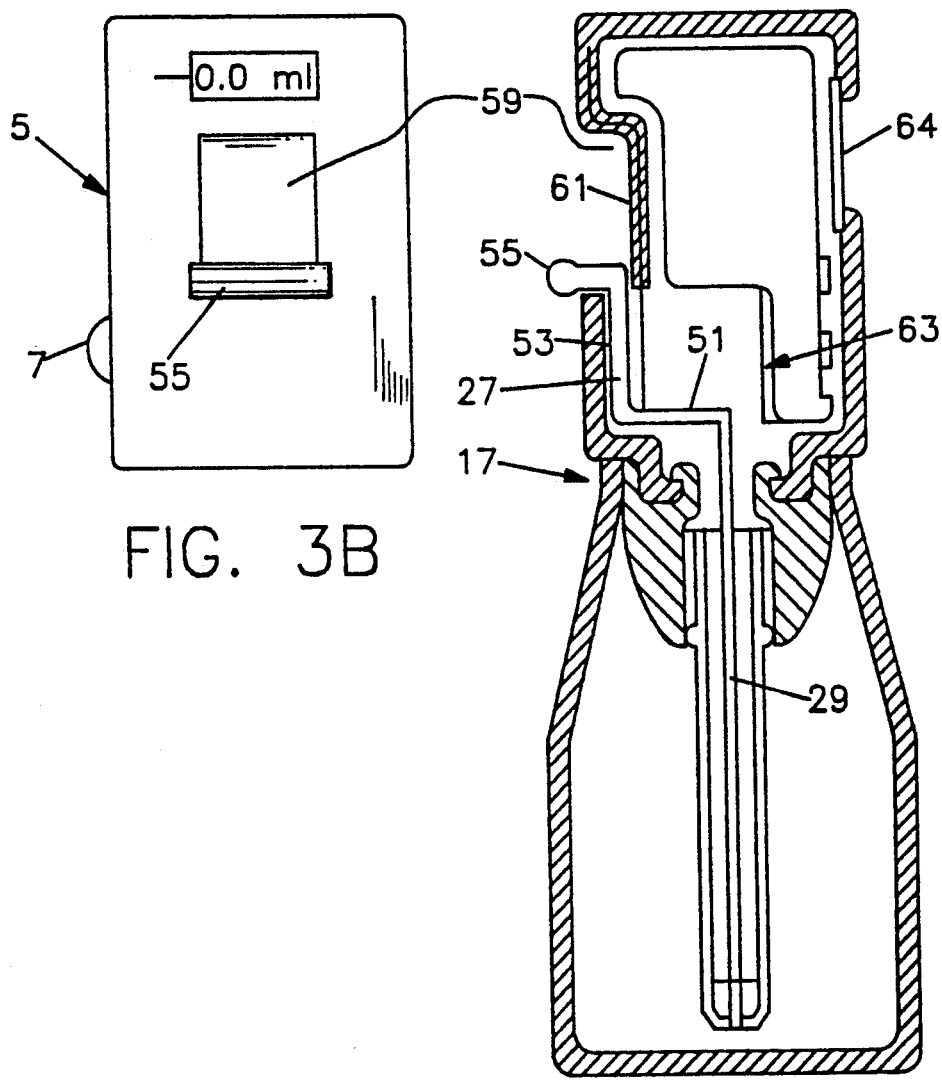
FIG. 3A is an elevational view, partly in section, of another embodiment of the invention.
FIG. 3B is a rear elevational view of the cap assembly portion of the apparatus shown in FIG. 3A.

The design of the medication apparatus shown in the embodiment of FIG. 3 is essentially the same as the designs of the foregoing two embodiments except as regards its activating means 27 which are manually powered or engagable. In this embodiment, the upper portion 35 of rod 29 comprises a short horizontal portion 51 fixedly connected to a vertical portion 53 which is in turn fixedly connected to a finger control portion 55 which extends through a side wall of external cap 9. The inner side of the finger control portion 55 abuts and is disposed against a rectangular recess 59 formed in the outer side wall surface of the external cap 9. The complete rod member 29 is preferably made in the form of a one-piece flexible plastic member. A dosage indicia label 61 is attached to the vertical surface forming the recess 59. A linear variable displacement transfer ("L.V.D.T.") 63 has a movable arm which is fixedly connected at its lower end to the inner end of the horizontal portion 51 of the rod member 29. The output of the L.V.D.T. 63 is then electrically coupled to the timer means 25 (only a portion of which is shown) which includes a conventional display 64 which display indicates the dosage of medicine taken and/or the elapsed time remaining between doses of medicine, depending on which function is chosen to be displayed.

Figure 4C:
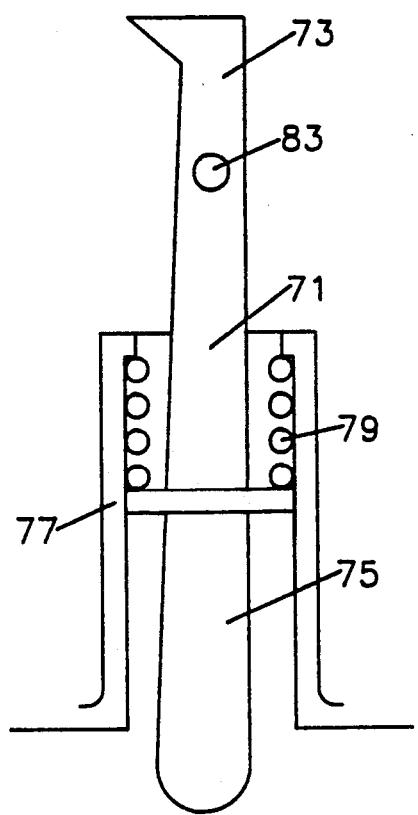
FIG. 4C is an enlarged fragmentary view of a portion of the automatic counter shown in FIG. 4A.
Figure 4D:
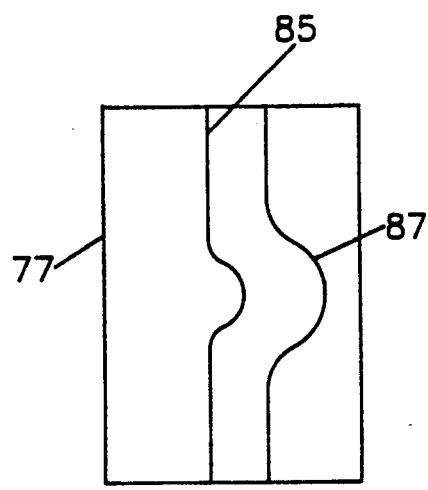
FIG. 4D is an enlarged fragmentary and elevational view of the track of the sleeve portion of the invention.

Referring now to FIGS. 4 wherein the automatic counter means 7 is shown disposed within the lower portion of the external cap 9, it comprises a reset wheel 65, an inner wheel 67 having number indicia on its edge, a ratchet wheel 69, all of which are fixed together so as to rotate together on the same axis, and an actuating rod 71 which drives the ratchet wheel 69. The actuating rod 71 has upper and lower portions, 73 and 75 respectively. The upper end of the upper portion 73 of rod 71 engages and drives ratchet wheel 69 in only a counterclockwise direction (because of ratchet lock 76). The lower portion 75 of rod 71 is mounted for reciprocating motion within an upstanding sleeve 77 and is biased in a downward direction by a surrounding spring 79. The lower end of the lower portion 75 of rod 71 engages a shoulder portion 81 of the liquid container 3, thereby preventing the rod 71 from moving any further downward until the cap assembly 5 is removed from the container 3. As shown in FIGS. 4C and 4D, the upper portion 73 of rod 71 has a pin 83 transversely fixed thereto and mounted within opposing pin tracks 85 (only one of which is shown) formed in the inner surface of sleeve 77. Each track 85 has a curved portion along its length to permit the rod 71 to move laterally, thereby permitting it to freely move downward when the cap assembly 5 is removed without it engaging ratchet wheel 69.

Referring now to FIGS. 1A and 1B, to initiate operation the function keys 42 on the timer 25 are utilized to indicate the desired dosage and time interval. The dosage desired is set by choosing the appropriate length pin 45 and inserting it through the upper side wall of the external cap 9 and screwing it into said wall. When the time interval set elapses, an alarm signal on the timer is initiated. The user then merely holds the container 3 while twisting the cap assembly 5 sufficiently (i.e. a quarter turn) to break the seal between them and then without removing the cap 5 commences to press the appropriate function key 42 to initiate aspiration. The linear solenoid 33 is then energized, thereby driving the track portion 39 of rod 29 upward. As the track 39 moves upward, the piston 21 retracts from its closed first position, thereby drawing liquid from the container 3 into the fluid passageway 19 until the upper end of the track 39 is stopped by the lower end of pin 45. At that point, the piston 21 has traveled upward to its uppermost and second position, thereby drawing the desired dosage of liquid medicine into the passageway 19 of the dropper 15. Another alarm then sounds, indicating that the correct dosage is ready for use. Then the user removes the cap assembly 5 (referring to FIG. 4) which disengages the lower end of the actuating rod 71 from the shoulder portion 81 of the container 3, freeing it to move downward. After the liquid medicine is taken by the user and the cap assembly 5 is refitted on the container 3, the rod 71 is driven upward to engage the teeth of the ratchet wheel 69, thereby rotating the ratchet wheel 69 counterclockwise and its attached reset wheel 65 one step to display the numeral "1" (assuming this is the first dosage of the day). Referring specifically to FIGS. 4C and 4D, the actuating rod 71 is permitted to travel downward without its upper end engaging the teeth of the ratchet wheel 69 by virtue of the travel of pin 83 (which is attached to the upper end 73 of rod 71) within the curved portion 87 of track 85 formed in sleeve 77.

Referring to FIG. 2, the operation of this embodiment is essentially the same as in the embodiment shown in FIG. 1 except that the rotary solenoid 47, when energized, rotates gear 49 whose teeth engage the teeth on track 39 to move it up and down.

Referring to FIG. 3, aspiration is manually accomplished by engaging the control portion 55 of activating means 27 and moving it upward in recess 59 until it is stopped in its upward travel at the upper end of the recess 59.

The invention has been described in detail with particular reference to the various embodiments thereof, but it will be understood that variations and modifications can be effected within the spirit and scope of the invention.

What is claimed is:

1. A medication dispensing apparatus comprising:
   a liquid container having an open end;
   a cap assembly engagably removable from the open end of said container comprising:
   an external cap having a lower end;
   an inner fixing means adapted to be fitted into the open end of said liquid container and connected to the lower end of said external cap;
   a dropper means, for dispensing liquid, connected through said inner fixing means and having a fluid passageway;

activation means for aspirating liquid from the container into the dropper means comprising:
a piston mounted in sliding relationship within said fluid passageway of said dropper means and having a first position at the lower end of said fluid passageway and a second position at the upper end of said fluid passageway; and
actuating means disposed within said external cap and connected to said piston means for advancing and retracting said piston within said fluid passageway thereby aspirating liquid from said container when said piston is retracted from its first position to its second position; said apparatus further comprising an automatic counter means disposed within said external cap and engaging a portion of said container for counting the number of times the cap assembly is disengaged from the liquid container.

2. A medication dispensing apparatus as defined in claim 1, wherein said automatic counter means comprises a spring biased actuating rod having upper and lower ends, a ratchet wheel mounted for rotation in only one direction, the upper end of said rod engaging said wheel and prevented from rotating while its lower end engages a portion of said container but permitting said wheel to rotate one step when its lower end is disengaged from and reengages a portion of said container.

3. A medication dispensing apparatus as defined in claim 1, wherein said activation means further comprises a timer including a control means, said control means coupled to said actuating means for controlling said actuating means.

4. A medication dispensing apparatus as defined in claim 1, wherein said actuating means comprises:
a rod member; and
activating means for moving the rod member;
said rod member having upper and lower portions, said lower portion longitudinally extending within said fluid passageway and fixedly connected at its lower end to said piston, said upper portion connected to said activating means.

5. A medication dispensing apparatus as defined in claim 4, wherein said upper portion of said rod member comprises a manually engageable activating means disposed against an outer surface of said external cap.

6. A medication dispensing apparatus as defined in claim 4, wherein said activating means comprises an electrically actuated actuating means.

7. A medication dispensing apparatus as defined in claim 1, wherein said actuating means further comprises dosage control means for setting the amount of liquid aspirated into the dropper means, said dosage means comprising limit means disposed within said cap assembly for preventing the upper portion of said rod member from traveling past a predetermined point.

8. A medication dispensing apparatus comprising:
a liquid container having an open end;
a cap assembly engagably removable from the open end of said container comprising:
an external cap having a lower end;
an inner fixing means adapted to be fitted into the open end of said liquid container and connected to the lower end of said external cap;
a dropper means, for dispensing liquid, connected through said inner fixing means and having a fluid passageway;
activation means for aspirating liquid from the container into the dropper means comprising:
a piston mounted in sliding relationship within said fluid passageway of said dropper means and having a first position at the lower end of said fluid passageway and a second position at the upper end of said fluid passageway; and
actuating means disposed within said external cap and connected to said piston means for advancing and retracting said piston within said fluid passageway thereby aspirating liquid from said container when said piston is retracted from its first position to its second position, wherein said actuating means comprises:
a rod member; and
activating means for moving the rod member;
said rod member having upper and lower portions, said lower portion longitudinally extending within said fluid passageway and fixedly connected at its lower end to said piston, said upper portion connected to said activating means, wherein said activating means comprises an electrically actuated solenoid; wherein said upper portion of said rod member comprises a track engagable with said solenoid and movable as a function of the position of said solenoid.

9. A medication dispensing apparatus comprising:
a liquid container having an open end;
a cap assembly engagably removable from the open end of said container comprising:
an external cap having a lower end;
an inner fixing means adapted to be fitted into the open end of said liquid container and connected to the lower end of said external cap;
a dropper means, for dispensing liquid, connected through said inner fixing means and having a fluid passageway;
activation means for aspirating liquid from the container into the dropper means comprising:
a piston mounted in sliding relationship within said fluid passageway of said dropper means and having a first position at the lower end of said fluid passageway and a second position at the upper end of said fluid passageway; and
actuating means disposed within said external cap and connected to said piston means for advancing and retracting said piston within said fluid passageway thereby aspirating liquid from said container when said piston is retracted from its first position to its second position, wherein said actuating means further comprises dosage control means for setting the amount of liquid aspirated into the dropper means, said dosage means comprising limit means disposed within said cap assembly for preventing the upper portion of said rod member from traveling past a predetermined point; wherein said limit means comprises an elongated pin extending from a side wall of said external cap and engaging a portion of the upper portion of said rod member during its travel, thereby preventing further travel thereof.

* * * * *